Figure 1:
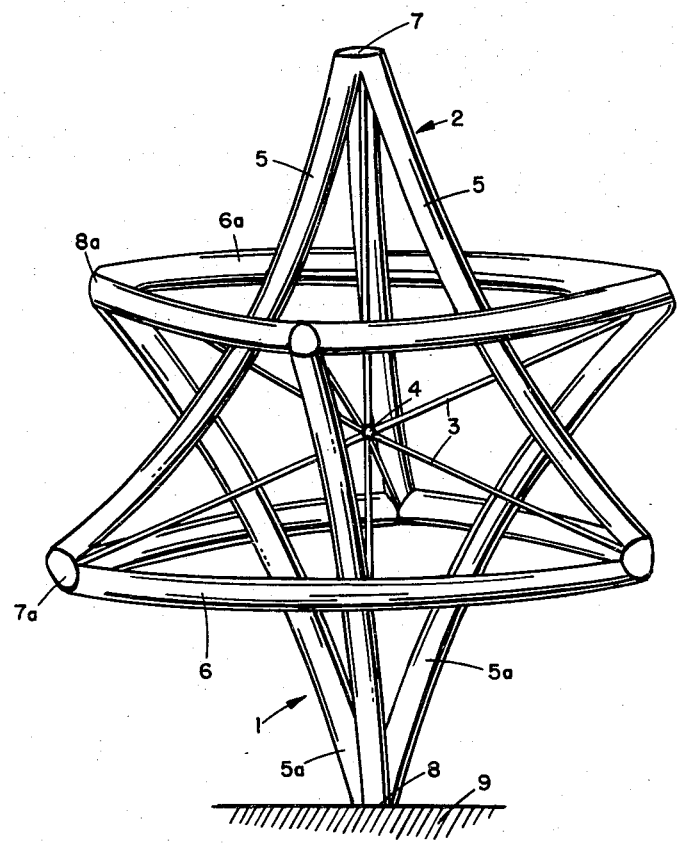

Aug. 23, 1960          R. B. HORSFALL, JR           2,950,079
                     THREE AXIS FLEXURE PIVOT
Filed June 4, 1956                              2 Sheets-Sheet 1

INVENTOR.
ROBERT B. HORSFALL Jr
BY
*William R. Lane*
ATTORNEY

United States Patent Office 2,950,079
Patented Aug. 23, 1960

2,950,079

THREE AXIS FLEXURE PIVOT

Robert B. Horsfall, Jr., Whittier, Calif., assignor to North American Aviation, Inc.

Filed June 4, 1956, Ser. No. 589,330

3 Claims. (Cl. 248—179)

This invention relates to a three axis flexure pivot and more particularly, to a flexible pivot which permits angular freedom but restrains linear movement.

Conventional gimbal frames, two or more in number, have been used in the past for mounting stabilized platforms, gyroscopes, and accelerometers to allow movement about the yaw, pitch and roll axes or other similar sets of axes. For the support of such platforms, "ball and socket" gas bearings, described in U.S. patent application, Serial Number 444,116, now Patent No. 2,806,911, filed July 19, 1954, for "Gyroscopically Stabilized Navigational Reference Device," have been satisfactory, except that they require a continuous gas supply and tend to be somewhat bulky. They are capable of sufficient angular freedom to eliminate the need for a redundant gimbal in a completely maneuverable platform and they minimize the demands of platform servos with respect to high performance. Despite the advantages of such a low-friction central support, in more recent designs redundant gimbals have been incorporated to conserve size and eliminate need for a gas supply. Gimbal bearings, however, bring in substantial friction torques and considerable effort has been expended on high performance platform servos to avoid excessive gyroscope disturbances from this source.

As an alternative means to minimize the demand for high performance of platform servos, a free joint for platform support which virtually eliminates friction and does not require an air supply has been provided in the present invention. An embodiment of the present invention consists generally of two interlaced tetrahedral frames secured together with wire or cable and having a minimum size connection at a common intersection of the wires. Other embodiments may be constructed from two suitably shaped frames having a plurality of flexure elements radiating from a common intersection point and having at least three of said flexure elements connected to each of the frames. These embodiments, made with unsymmetrical frames, do not have isoelastic properties as provided where the flexure elements are attached to corners in the position of the vertices of regular tetrahedra, which is the preferred embodiment.

It is therefore an object of this invention to provide an improved three axis flexure pivot.

A principal object of this invention is to provide a three axis flexure pivot which prevents linear movement but which allows complete angular freedom over a limited angular range.

A further object of this invention is to provide a three axis flexure pivot which eliminates frictional problems by substituting a calculable spring reaction force for frictional coercion which is not calculable.

A still further object of this invention is to provide a three axis flexure pivot in which the flexure elements may be subjected to tension, torsion, compression, or bending forces without detrimental effect on the properties of the pivot.

Another object of the present invention is to provide a three axis flexure pivot which is isoelastic, that is, having elastic properties which are in all directions the same.

A further object of this invention is to provide a three axis flexure pivot suitable for use to support stabilized platforms, accelerometers and other measuring instruments which require isolation from angular movements of their base.

Figure 2:
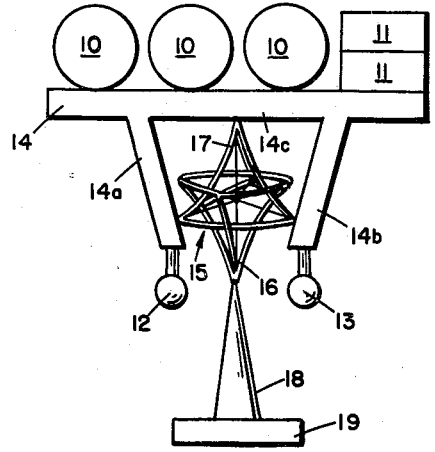

Other objects of invention will become apparent from the following description taken in connection with the accompanying drawings, in which:

Fig. 1 illustrates an isoelastic three axis flexure pivot;
Fig. 2 is a view of the pivot in Fig. 1 supporting a stabilized platform.

Referring to Fig. 1, frame 1 is shown fixed to a stationary frame 9, as may be provided within an aircraft. Frame 2 is interlaced with frame 1 and they are held together by eight flexure elements 3, each radiating from a common intersection point 4. The flexure elements 3 are connected to corners on frames 1 and 2 which are located so as to be in the position of vertices of regular tetrahedra; that is, frames 1 and 2 are not regular tetrahedra but have their corners located in the positions of vertices of regular tetrahedra. The frame members, such as 5, 5a, 6 and 6a, do not form rectilinear tetrahedra because they are distorted, that is, do not have straight edges. They are curved to achieve necessary clearance for freedom of movement between the two frames, e.g., frame members 5 and 5a are concave or curved inwardly and frame members 6 and 6a are convex or curved outwardly. Frame members 6 and 6a may be eliminated if members 5 and 5a are made rigid enough to support the predetermined load.

The flexure elements 3 may be made of a spring filament, single wires or may be wire cables. They may be made of four single elements, each extending from one vertex on one frame to the diametrically opposite vertex on the other frame, as from vertex 7 on frame 2 to vertex 8 on frame 1, which is fixed to base 9. They also may be strung from each vertex, as 8a, on frame 1 to the center point 4 and then returned to an adjacent vertex 7a, on frame 2. In other words, there could be four elements extending from a corner on one frame to the center, each bent around the other three and returned to an adjacent corner on the other frame. It is also possible to have eight individual flexure elements all joined together at the center point 4. The elements may be secured together at the center point by some means, such as a small swaged metal sphere or by tying with wire. This is required to prevent linear movement and friction between flexure elements.

In the preferred embodiment in Fig. 1, each vertex, as 7 and 8, on either frame is a point on an imaginary sphere whose center is at point 4. This symmetrical configuration provides isoelasticity. In any elastic structure, such as the embodiment shown in Fig. 1, some deformation necessarily occurs when the frames are subjected to linear acceleration. If the frames and flexure elements have elastic properties which are directional in nature; i.e., if more deformation occurs in one direction than in another, the result will be that in general the center of mass will shift out of the line of the action of the acceleration. If this occurs the acceleration produces a moment or torque equal to the product of the distance of shift from said line of action, the mass of the supported body and the acceleration. Since the flexure pivot cannot be made infinitely rigid, it is desirable to construct it to be isoelastic, i.e., to have elastic properties which are in all directions the same. If the angle between the line produced by movement of the mass center of an object subjected to acceleration and the line of action of the acceleration be denoted the error angle, it can be seen that the optimum flexure pivot will be one having a minimum error angle. This result has been achieved in the above described embodiment of the present invention by making the two frames symmetrical; by having the connection points for the flexure elements, from one frame to the other, on the corners of two regular tetrahedra, said tetrahedra being inscribed in an imaginary sphere whose center is at the common intersection point of the flexure elements; and by making the said flexure elements substantially identical. Equally satisfactory isoelastic properties can be attained by making the two frames of different sizes; each, however, providing connection points at the corners of a regular tetrahedron inscribed in a sphere, centered at the said common intersection point, but the two spheres having different radii. These isoelastic flexure pivots can be used under conditions where they are subject to severe linear accelerations without permitting disturbing moments because deformation of the elastic parts occurs so that the mass center moves in substantially the same direction as the acceleration producing movement.

Fig. 2 shows an isoelastic flexure pivot 15, similar to the one shown in Fig. 1, employed to support a stabilized platform 14. Fixed frame 16 of pivot 15 is supported by stand 18 which is secured to a stationary base 19. Base 19, for example, may be in an aircraft or guided missile. Frame 17, having limited angular freedom, supports platform 14 at three points, one being on each leg 14a and 14b and the other being on the underside 14c. Gyroscopes 10 and accelerometers 11 are mounted on platform 14 and their weights are balanced by weights 12 and 13 to fix the center of gravity of the supported mass at the approximate center of pivot 15; that is, at the point of intersection of the flexure elements. Platform 14 tends to maintain itself in a fixed angular attitude with respect to space and is mechanically constructed to have three degrees of rotational freedom with respect to its supporting craft. This angular freedom is effected by the present invention.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A flexure pivot comprising a first substantially triangular base formed of outwardly curved interconnected legs, three upstanding inwardly curved legs interconnected at their apex forming substantially a tetrahedron with said base, a second substantially triangular base formed of outwardly curved interconnected legs and located in a plane intermediate the plane of said first base and the apices of said upstanding inwardly curved legs, three inwardly curved legs extending downwardly through said first base and interconnected at their nadir below the plane of said first base forming substantially an inverted tetrahedron, flexure elements extending from the apices of each of said tetrahedrons to a central connection point within each of the tetrahedrons and means to connect said flexure elements at said central connection point.

2. The invention as set out in claim 1 in which the apices of the first-mentioned tetrahedron support an oscillatable load and the nadir point of said inverted tetrahedron is fixedly mounted to a fixed base.

3. A flexure pivot comprising a first base portion having three spaced connecting points therein, three leg portions extending from said connecting points to a common point, said connecting points and said common point being located in the position of vertices of a first tetrahedron, a second base portion having three spaced connecting points therein, three leg portions extending from said connecting points of said second base portion to a second common point, said second base portion connecting points and said second common point being located in the position of vertices of a second tetrahedron intersecting said first tetrahedron, flexure elements extending from each of said first and second base portion connecting points and said common points to a single connection point within said tetrahedrons, and means to connect said flexure elements at said single connection point.

References Cited in the file of this patent

UNITED STATES PATENTS

| | | |
|---|---|---|
| 2,353,943 | Storch | July 18, 1944 |
| 2,457,425 | Wolfard | Dec. 28, 1948 |
| 2,664,257 | McNally | Dec. 29, 1953 |

FOREIGN PATENTS

| | | |
|---|---|---|
| 897,928 | France | June 12, 1944 |